United States Patent [19]

Schedl et al.

[11] Patent Number: 4,790,993

[45] Date of Patent: Dec. 13, 1988

[54] PROCESS FOR THE PRODUCTION OF ALCOHOL-FREE, YEAST WHITE BEER

[75] Inventors: Siegfried Schedl; Hermann Eppinger; Volker Schuler, all of Munich, Fed. Rep. of Germany

[73] Assignee: Paulaner-Savator-Thomasebraeu AG, Munich, Fed. Rep. of Germany

[21] Appl. No.: 14,505

[22] Filed: Feb. 13, 1987

[30] Foreign Application Priority Data

Feb. 27, 1986 [DE] Fed. Rep. of Germany ....... 3606450

[51] Int. Cl.⁴ ............................................. C12C 11/00
[52] U.S. Cl. ...................................... 426/13; 426/14; 426/16; 426/29; 426/493; 426/592
[58] Field of Search ....................... 426/11, 13, 14, 16, 426/28, 29, 592, 493, 494, 61, 62; 435/93

[56] References Cited

U.S. PATENT DOCUMENTS 1,337,027  4/1920  Straus .
1,908,407  5/1933  Coupeau et al. ................... 426/493
3,852,495  12/1974  Schimpf et al. ..................... 426/14

FOREIGN PATENT DOCUMENTS 135785  12/1919  United Kingdom .
2112619  7/1983  United Kingdom .

Primary Examiner—Marianne Cintins
Attorney, Agent, or Firm—Felfe & Lynch

[57] ABSTRACT

Disclosed is an alcohol-free yeast white beer and a process for its production wherein the yeast is physically separated from an alcohol containing yeast white beer free of fermentable substances. The beer is then subjected to a vacuum distillation until the alcohol content has been reduced to less than 0.5% by volume to produce a beer concentrate. A corresponding amount of oxygen-free, carbonic acid-containing make-up water is added to the concentrate. Subsequently, top-fermented brewers' yeast is added in an amount above the content normally present in yeast white beer, and thereafter the product is stored at a temperature of from 0° to 10° C. Subsequently, yeast is again separated off and thereafter the desired amount of yeast and carbon dioxide is added.

13 Claims, 1 Drawing Sheet

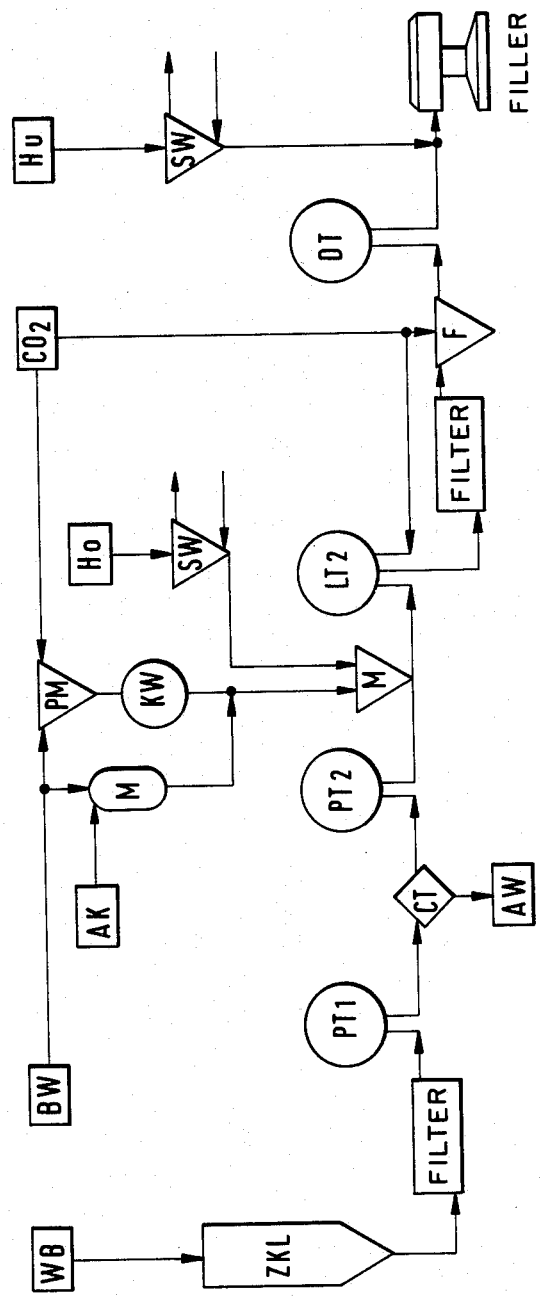

PROCESS FOR THE PRODUCTION OF ALCOHOL-FREE, YEAST WHITE BEER

BACKGROUND OF THE INVENTION

The present invention is in a process for the production of alcohol-free yeast white beer.

Yeast white beer is a widely consumed, alcohol-containing beer whch is produced by methods used for the production of white beer and which is visibly turbid due to the presence of suspended yeast.

Since, in general, the requirement for alcohol-free beers, i.e. beers which contain less than 0.50% by volume of alcohol, is increasing, there is also a need for a process which permits the production of a typical yeast white beer without an alcohol content according the the above-given definition.

It is known to free normally brewed beer from alcohol by distillation in a vacuum and to carbonate the remainder. In the case of this process, there is already the problem that the beers thus obtained do not have a satisfactory flavor. Since yeast white beer is characterised by its characteristic flavor nuance, which is essentially due to the yeast content, a product cannot be obtained by a simple vacuum distillation of the alcohol which, from the point of view of flavor, could still be regarded as being a typical yeast white beer.

SUMMARY OF THE INVENTION

Therefore, it is an object of the present invention to solve this problem and to provide a process for the production of a yeast white beer which displays the typical flavor properties of normal yeast white beer.

Thus, according to the present invention, there is provided a process for the production of an alcohol-free yeast white beer, wherein (a) the yeast is physically separated from an alcohol-containing yeast white beer which no longer contains any fermentable substances, thereafter (b) subjects it to a vacuum distillation until the alcohol content has been reduced to less than 0.5% by volume, then (c) the loss of water due to the vacuum distillation is made up by adding a corresponding amount of oxygen-free, carbonic acid-containing water, (d) subsequently, top-fermented brewers' yeast is added in an amount above the content normally present in yeast white beer, thereafter (e) the product is stored at a temperature of from 0° to 10° C., subsequently (f) the yeast is again separated off and thereafter (g) the desired amount of yeast and carbon dioxide is added to the end product.

The various features of novelty which characterize the invention are pointed out with particularity in the claims annexed to and forming a part of this specification. For a better understanding of the invention, its operating advantages and specific objects obtained by its use, reference should be had to the accompanying drawing and descriptive matter in which there is illustrated and described a preferred embodiment of the invention.

BRIEF DESCRIPTION OF THE DRAWING

The drawing schematically depicts a process according to the invention.

DESCRIPTION OF A PREFERRED EMBODIMENT

The process according to the present invention starts from an alcohol-containing yeast white beer produced in the usual way. Barley and wheat malt is hereby subjected to a normal brewing process and subsequently a young beer is obtained with normal top fermentation which, after the addition of wort, is subjected to a maturing phase at about 10° C. and, after breakdown of the diacetyl, to a cold storage phase of at least 2 weeks at about 0° C. The bung pressure applied is preferably so adjusted that the carbonic acid content does not become too high but is from about 0.3 to 0.6%. For the production of yeast white beer, general reference is made to L. Narziss, Technologie der Bierbereitung, Vol. 2, pub. Enke-Verlag, Stuttgart, Germany.

A matured and stored yeast white beer of this kind is now freed from dispersed yeast, which can take place physically by filtration or centrifuging. Filtration over coarse kieselguhr has proved to be especially useful.

The so treated yeast white beer is subsequently subjected to vacuum distillation. It has proved useful to use a temperature of from 38° to 48° C. and the corresponding reduced pressure, the vacuum distillation preferably being carried out at a temperature of from 42° to 44° C. and a corresponding pressure of from 0.06 to 0.1 bar absolute. Especially preferably, this vacuum distillation is carried out in a vacuum centrifuge with a heated mantle. In this process step, the alcohol of the beer evaporates almost completely, together with a certain amount of water, a beer concentrate being obtained with an alcohol content of from about 0.30 to 0.48% by volume.

The so obtained beer concentrate, which is preferably cooled, is mixed with oxygen-free, carbonic acid-containing water in an amount which corresponds to the volume of liquid which has been distilled off. It is preferred to use degassed and carbonised brewery water. In general, the amount necessary is from about 25 to 30% by volume. The carbon dioxide content of the added water is preferably from about 0.4 to 0.8% by weight.

Between the vacuum distillation and the making up of the water loss, it is preferred to carry out an intermediate storage at a temperature of from 0° to 10° C. and preferably of 0° C.

According to a preferred embodiment of the process according to the present invention, a certain amount of active charcoal, preferably in the form of a suspension, is added to the product thus obtained. The amount of active charcoal is preferably about 50 to 100 g./hl. but this addition can also be completely omitted or replaced by a larger or smaller amount. By means of this active charcoal step, it is possible to remove a bitter flavor arising after the vacuum distillation as is desired.

In the next step, to the beer made up to the original volume and possibly mixed with active charcoal is added top-fermented yeast in an amount which is greater than the yeast content of conventional yeast white beer. The amount added is preferably from 1 to 3% is especially preferably about 2%. The yeast added is preferably previously carefully purified by washing and freed from traces of alcohol.

Subsequently, for aromatisation, the product is left to stand at a temperature of from 0° to 10° C., preferably for at least 5 days. At the same time, it is preferable to apply a slightly reduced pressure of, for example, from 0.3 to 1 bar. During this aromatisation treatment, the temperature is allowed to decrease gradually to the lower limit of the given temperature range, i.e. to about 0° C. It has proved to be advantageous to blow in carbon dioxide from time to time, the aroma exchange hereby being accelerated.

Subsequently, in the next process step, the added yeast is again physically separated as previously described.

In the final step, the desired kind of yeast and carbon dioxide are added in the amounts desired in the end product. In general, the amount of yeast added is from about 0.5 to 1 l./hl and preferably about 0.6 to 0.8 l./hl. in the form of a viscous yeast. It is preferable to use bottom-fermented yeast which, like the top-fermented yeast used, has preferably been washed for the removal of alcohol.

There is thus obtained a yeast white beer of typical appearance and flavor, the alcohol content of which has been reduced to below 0.5% by volume, which can be bottled, stored and transported in the usual way.

The following Example will illustrate the invention with reference to the drawing.

EXAMPLE

A young beer obtained from a normal brewing process with the usual amounts of barley and wheat malt and subsequent normal top fermentation is placed in a storage vessel WB. From there, it is subjected in a cylindroconical tank ZKL, with the addition of about 10 to 15% wort, to a maturing phase at about 10° C. until the diacetyl has decomposed and thereafter to a cold storage phase of at least 2 weeks at 0° C. The bung pressure is adjusted to about 0.4 to 0.5%.

The matured and stored white beer is filtered over coarse kieselguhr and passed into a buffer tank PTI. The storage temperature is 1° C. and the pressure is about 2.5 bar overpressure. After a holding time of less than one day, the beer is then passed on from the buffer tank PTI via a centrifugal vacuum distillation plant CT (Centritherm plant type CT 6 of Alfa-Laval). The temperature is here between 35° and 50° C. and the pressure $-0.9$ bar (about 0.1 bar absolute). The alcohol-water mixture distilled off azeotropically is collected in tank AW and removed from the process.

The beer concentrate obtained, with an alcohol content of about 0.45%, flows through a cooler (not shown) in which it is cooled at about 5° C. and then passed to a buffer tank PT2. From there, the beer concentrate is mixed in a mixing plant M with brewery water, carbon dioxide and active charcoal. The brewery water is hereby de-aerated in a pre-mixer PM, carbonised with carbon dioxide from a $CO_2$ container and stored in a carbonic acid-water tank KW. Active charcoal from storage vessel AK is mixed with brewery water in mixing tank M and fed into a connection pipe between KW and mixer M. Top-fermented yeast from container HO passes over a sieve and washing plant SW also to the mixer M. The amount of brewery water added is from 25 to 30% and the amount of carbon dioxide added is 0.6%. The amount of active charcoal added is about 75 g/hl. The amount of top-fermented yeast added, in the form of a viscous suspension, is about 2%.

From the mixer M, the beer is passed to storage tank LT2 and is there stored for at least 5 days at a temperature dropping from 10° C. to 0° C. and under a overpressure of about 0.5 bar. For an improved mixing, carbon dioxide is blown in once per day, this carbon dioxide also being taken from the $CO_2$ container.

After storage, the beer from the storage tank LT2 is filtered over a filter provided with coarse kieselguhr and, by the addition of carbonic acid, is brought in mixer F to a carbon dioxide content of from 6.5 to 8.0 g/hl. The beer is then passed on to a pressure tank DT and from there to a filling plant. Into the pipe leading to the filling plant, there is introduced, in the amount desired in the end product of about 0.5 to 1 l./hl., bottom-fermented yeast from tank HU via a sieve and washing plant SW.

It will be understood that the specification and examples are illustrative but not limitative of the present invention and that other embodiments within the spirit and scope of the invention will suggest themselves to those skilled in the art.

We claim:

1. A process for the production of an alcohol-free yeast white beer comprising:
   providing an alcohol-containing yeast white beer which contains yeast and does not contain a fermentable substance;
   physically separating the yeast therefrom;
   subjecting the alcohol-containing beer to vacuum distillation until the beer has an alcohol content of less than 0.5% by volume to produce a beer concentrate, whereby an amount of water is lost;
   adding to the concentrate as make-up water oxygen-free, carbonic acid-containing water in an amount substantially corresponding to the amount of water lost during the vacuum distillation;
   adding top-fermented brewers' yeast in an amount of about 1–3% by volume to the concentrate containing make-up water to form a product;
   storing the product at a temperature of from 0° to 10° C.;
   separating off the added brewers' yeast; and
   adding a sufficient amount of yeast and carbon dioxide to form the resultant alcohol-free yeast white beer.

2. The process of claim 1 wherein the vacuum distillation is carried out at a temperature of from 38° to 48° C. at a reduced pressure.

3. The process of claim 2 wherein the vacuum distillation is carried out at a temperature of from 42° to 44° C. and at a pressure of from 0.06 to 0.1 bar.

4. The process of claim 1 wherein the beer concentrate is stored at a temperature of from 0° to 10° C. following the vacuum distillation.

5. The process of claim 4 wherein the beer concentrate is stored at a temperature of 0° C.

6. The process of claim 1 wherein the make-up water is degassed brewery water having 3 to 7 g/liter of carbon dioxide.

7. The process of claim 1 wherein the make-up water addition is 25 to 30% by volume.

8. The process of claim 1 wherein active charcoal is added to the concentrate during or after addition of the make-up water.

9. The process of claim 8 wherein 50 to 100 g/hl. active charcoal are added to the concentrate.

10. The process of claim 9 wherein the physical separation of the yeast is carried out by filtering or centrifuging.

11. The process of claim 1 wherein the product is stored for at least 5 days.

12. The process of claim 1 wherein the yeast added with the carbon dioxide is bottom-fermented yeast.

13. The process of claim 9 wherein the active charcoal is separated from the concentrate containing make-up water

* * * * *